Figure 1:
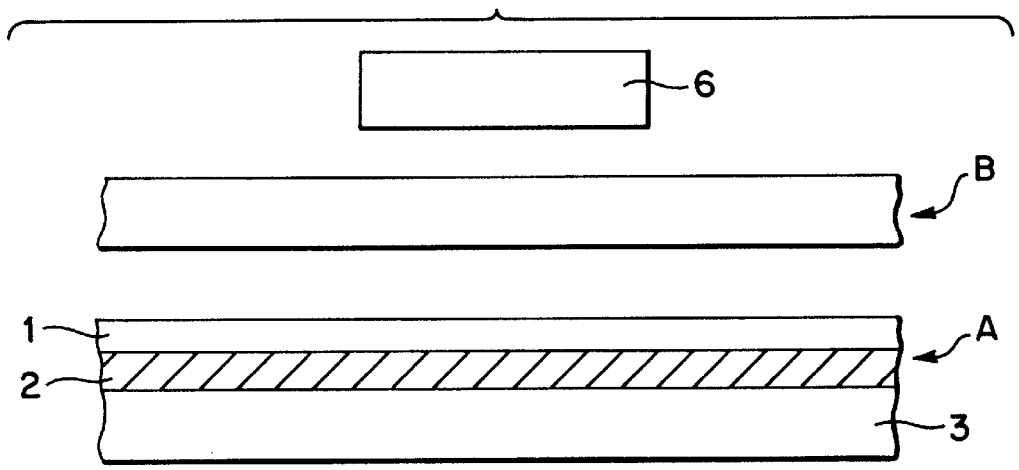

United States Patent

Christopherson et al.

[11] Patent Number: 5,965,254
[45] Date of Patent: Oct. 12, 1999

[54] POLYMERIC FILMS

[75] Inventors: Roy Christopherson, Swindon; Peter John Miles, Bristol, both of United Kingdom

[73] Assignee: Rexam Medical Packaging Ltd., United Kingdom

[21] Appl. No.: 08/859,035

[22] Filed: May 20, 1997

[30] Foreign Application Priority Data

Apr. 4, 1997 [GB] United Kingdom ............... 9706901

[51] Int. Cl.⁶ .................................................. C09J 7/02
[52] U.S. Cl. ................... 428/349; 428/354; 428/355 EN
[58] Field of Search ........................... 428/349, 354, 428/355 EN

[56] References Cited

U.S. PATENT DOCUMENTS

| 4,759,984 | 7/1988 | Hwo | 428/349 |
| 4,808,662 | 2/1989 | Hwo | 525/74 |
| 4,870,134 | 9/1989 | Hwo | 525/221 |
| 5,066,543 | 11/1991 | Hwo | 428/516 |
| 5,185,203 | 2/1993 | Itaba | 428/349 |
| 5,436,041 | 7/1995 | Murschall | 428/349 |

*Primary Examiner*—Jenna Davis
*Attorney, Agent, or Firm*—Bacon & Thomas, PLLC

[57] ABSTRACT

Heat sealable polymeric films having an outer, polymeric heat seal layer with a viscosity at its heat sealing temperatures such that it will flow into interstitial spaces between the fibers of a fibrous material and encapsulate the fibers at such temperatures, an intermediate polymeric layer in contact with the heat seal layer, the intermediate polymeric layer being capable of cohesively splitting when the heat sealed film is peeled, and at least one further polymeric layer, the heat seal layer being easier to fracture than the intermediate layer at the temperature at which peeling is to be effected so that heat seal layer ruptures rather than peeling continuing through the intermediate layer once peeling has been effected through the heat sealed zone.

19 Claims, 1 Drawing Sheet

POLYMERIC FILMS

This invention concerns polymeric films which are capable of being heat sealed to surfaces to provide peelable seals between the films and such surfaces.

Peelable seals between polymeric films and a variety of surfaces are well known in the packaging art, for example for the packaging of foodstuffs and medical equipment. The ability to peel such seals generally facilitates the opening of sealed packages, and in addition such seals often provide evidence of tampering once they have been peeled.

The mechanism by which such seals can be peeled, and the force required to do so, will usually depend on the materials involved in forming the heat seal. However, peeling will either involve separation of the boundary between different materials in the seal area or the internal rupture of a polymeric layer through the seal area.

Peeling by layer separation through the heat seal can either be by failure of the heat seal itself or by failure of the inter-ply adhesion between layers of the film or of the material to which the film is heat sealed. In general both occur as a result of an at least partial incompatibility between two adjacent layers which are to be peeled so that when peeling is effected the layers part at the interface between these layers. Examples of peelable seals which fail by parting of the heat seal itself are described in EP0258527, a film consisting of a layer of polyethylene having a heat seal layer of a blend of polyethylene and polyisobutylene being peelable from polypropylene film after having been heat sealed to it. In this case the partial incompatibility occurs between the blend of polyethylene and polyisobutylene in the heat seal layer and the polypropylene film to which it is heat sealed, there being a much higher compatibility between the blend and the polyethylene of the heat sealable film. As will be appreciated, such incompatible blends of polymers can also be used to weaken the inter-ply strengths within heat sealable films so that when their heat seals are peeled, the plys separate.

The problem with peeling of the heat seal itself is that in general the ability of the seal to peel depends on both the composition of the heat seal layer of the film and the polymer which forms the surface to which it is heat sealed. Thus the incompatibility at the interface between the film and the surface to which it is to be sealed can range from high, with the result that unacceptably low seal strengths result, to low, so that the resulting heat seals are so strong that they will not peel before tearing of the film occurs. Furthermore, when such seals do peel they usually don't provide evidence that peeling has taken place. This latter deficiency is a particular problem in the packaging of foodstuffs and medical equipment where maintaining sterile conditions within packages is essential and the risk of a package being opened and re-sealed without demonstrable evidence that the pack has been opened cannot be tolerated.

It should also be appreciated that although peeling at the heat seal layer/article interface may be possible to achieve by a suitable choice of polymers for the heat seal layer and the article to which it is to be heat sealed, this can become impossible if the article is made of other materials, for example fibrous materials such as uncoated paper, and other fibrous non-woven materials such as the material sold by DuPont under the Trade Mark "Tyvek". This is a serious deficiency because paper is widely used as a packaging material for medical equipment.

Heat sealable films which peel by failure at an inter-ply boundary within their structures can be used to form peelable seals with a wide variety of materials, for example paper and thermoplastic polymers, since the strength of the heat seal does not determine peelability. Because peeling of the seal occurs within the thickness of the heat sealable film by (1) breaking through the seal layer at the beginning of the peel, then (2) delamination in the region of the heat seal, and (3) breaking through the seal layer at the end of the peel, part of the film necessarily remains adhered to the surface to which it has been heat sealed, resulting in strings of polymer hanging from the edges of the heat seal zone. Not only is this unsightly, it can potentially cause contamination of the packaged goods, and this could present very serious problems with medical equipment, for example syringes and equipment to be used with blood products. In addition, as the delamination is an adhesive peel this leads to a lack of evidence of seal integrity and thus such seals are not tamper evident. Coextrusions of high density polyethylene and Surlyn (Trade Mark) for cereal packet liners are examples of this type of peelable seal system.

As an alternative to peeling at layer boundaries, it has also been proposed to form peelable heat seals by the use of heat sealable films which include at least one outer layer having a relatively low internal cohesive strength. Peeling then takes place by rupturing of this layer within its thickness, with the result that when the heat seal area is opened part of this layer remains on the peeled film and part also remains on the surface to which the film has been heat sealed. Peeling of such films is in general dependant on the nature of the surface to which the film is heat sealed. Such seals can provide evidence of tampering because the area of the film where the relatively weak layer has peeled apart often becomes opaque. However, stringing and consequential possible contamination can be a problem with such films, since peeling within the layer having a low internal cohesive strength rather than rupture to the outside of the film tends to continue outside the heat seal zone.

Examples of layers which can be used to produce seals which peel by rupture within their thickness include blends of thermoplastic polymers with incompatible fillers. Such fillers can be inorganic particulates or incompatible polymers. As will be appreciated, for such layers to rupture internally rather than merely tear, they will need to have bond strengths to adjacent layers which are stronger than the internal cohesive strength of the layer itself.

Heat seals of polymeric films to non-woven materials having adhesive coatings can provide evidence of peeling of seals formed between them, adhesive failure being within the coating at the interface between the film and the non-woven material. This can lead to a whitening or opacity in the heat sealed region of the film as coating has transferred to the film where peeling has taken place. Furthermore, they tend to have fairly constant peel strengths after sealing irrespective of the temperature and pressure used to form the seal because peel strength only depends on the mechanical properties of the coating when sealing occurs within it. This is in contrast, for example, with low density polyethylene/polybutene peel systems where peel strength tends to depend on sealing temperature, the time taken to form the seal, and the pressure used to effect the seal.

According to the present invention there is provided a heat sealable polymeric film comprising an outer, polymeric heat seal layer having a viscosity at its heat sealing temperatures such that it will flow into and penetrate the fibrous structure of a fibrous material at such temperatures, an intermediate polymeric layer in contact with the heat seal layer, the intermediate polymeric layer being capable of cohesively splitting when the heat sealed film is peeled, and at least one further polymeric layer, the heat seal layer being easier to fracture than the intermediate layer at the temperature at which peeling is to be effected so that heat seal layer ruptures rather than peeling continuing through the intermediate layer once peeling has been effected through the heat sealed zone.

Films in accordance with the present invention have been heat sealed to paper to form heat seals which peel readily with low stringing. Furthermore, the peeled seals have shown good evidence of peeling through the second layer, this being enhanced by pigmenting the heat seal layer or the second layer. The consequence of pigmenting either the heat seal layer or the second layer is that the paper in the peelable regions of the seal becomes pigmented because the heat seal layer has penetrated into the paper during the heat sealing process. On effecting peeling the heat seal layer ruptures through the second layer, the second layer splits internally, and corresponding regions of the film and paper become opaque and pigmented in the seal region, thereby providing very good evidence of tampering with the seal. In addition to providing evidence of tampering, pigmentation of the heat seal layer also facilitates checking of the integrity of the seal after it has been formed because the appearance of the heat seal layer usually changes in regions where good heat sealing has taken place.

Films in accordance with the present invention have shown good evidence of peeling through the second layer, with the same mechanism as mentioned above, this being enhanced by pigmenting the outer, heat seal layer or the second, peel layer and with the third layer being of a different color. In this case, for example with the seal layer blue and the third layer yellow, the film and the heat seal region look green, while the peeled region of the non-woven material looks blue and the peeled regions of the film look a frosty yellow. Other color combinations are also possible, for example red and yellow to produce orange films and seals, and blue and red to produce purple films and seals.

Peelable seals formed between films in accordance with the present invention and non-wovens have shown substantially constant peel strengths irrespective of heat seal temperature as a result of the peel strength primarily depending on the mechanical properties of the second layer and not the strength of the heat seal. This can enable films of the present invention to be used in applications where heat sealing is effected within a wide temperature range using a wide range of sealing conditions. These are features normally associated only with cohesive splitting of polymeric coatings applied to non-wovens adhered to films and simple delamination type peels.

When heat sealed to paper the peeling force is preferably less than 3N/15 mm, and when heat sealed to non-woven fabrics this force can usually be higher, for example less than 8N/15 mm with the non-woven fabric sold under the Trade Mark "Tyvek".

The polymer forming the heat seal layer should be such that at the temperatures used to form heat seals, for example 110 to 180° C., it should have a sufficiently low viscosity that it penetrates into and around the fibers of the fibrous materials to which the films are being heat sealed. Penetration of the heat seal layer into the fibrous layer in general serves to effect a mechanical interlocking between the heat seal layer and the fibrous material. The depth of penetration and the degree of interlocking will depend upon the chemical composition and the relative quantities of the materials forming the seal layer, the fiber dimensions, packing and type, the openness of the sealing face of the non-woven material, and the heat sealing temperature, pressure and dwell time. In addition, it should also be sufficiently brittle to facilitate rupture through to the second layer where peeling takes place.

The polymer for the heat seal layer is preferably a polyolefin in admixture with a polymer which is itself a brittle solid at room temperature but which has a low viscosity when melted. Examples of polyolefins which can be used to form the heat seal layer include polyethylene, for example low density polyethylene or linear low density polyethylene, and copolymers of propylene and ethylene. The brittle additive is preferably compatible with the polymer with which it is blended, and examples of such additives include poly-di-pentene, polyterpenes, $\alpha$-methyl styrene resins, vinyltoluene/$\alpha$-methyl styrene resins, modified aromatic resins and other low molecular weight hydrocarbon resins. Examples of brittle additives which can be used in accordance with the present invention include hydrogenated and pure monomer hydrocarbon resins sold by Hercules Inc under the Trade Marks "Regalite", "Kristalex" and "Piccotex".

The relative amounts of polymer and additive in the heat seal layer can usually be varied widely. However, very small amounts of a brittle additive will result in the heat seal layer itself being insufficiently brittle to break upon peeling when the heat seals are peeled, and very large amounts of such an additive can adversely affect the heat seal and other properties of this layer. Preferred blends contain at least 5 wt % of a brittle additive, but it is generally preferred that they should contain not more than 30 wt % of such an additive.

The intermediate layer serves to impart peelability to films of the present invention by cohesive splitting within the thickness of this layer. However, it is particularly preferred that the force per unit area required to effect peeling of the seal is less than the force per unit area required to remove fibers from a fibrous material when the film has been heat sealed to such a material.

Examples of materials which can be used to achieve this effect are known in the art. Preferred materials are blends of polyolefins with organic or inorganic fillers. Examples of polyolefins which can be used to form the intermediate layer include polyethylenes, for example low density polyethylene, and copolymers of propylene and ethylene. Low density polyethylene and polypropylene are particularly preferred as they have a low elongation at break when compared with other polyolefins, for example polybut-1-ene and linear low density polyethylene.

Any of a wide variety of fillers can be used to impart cohesive splitting to the intermediate layer, such fillers serving to reduce the internal cohesive strength of the polymer used to form the layer. The filler can be organic or inorganic, examples of fillers which can be used for the purpose including chalk, talc, titanium dioxide, barium sulfate, magnesium sulfate, polybutene, polypropylene and other incompatible polymers. In addition, the term filler can include a gas which can be introduced using a foaming agent blended into the intermediate layer which foams the intermediate layer at the elevated temperatures to which the polymer melt is subjected during any hot extrusion process. Foaming can also reduce the internal cohesive strength of the polymer used to foam the layer.

The amount of filler required to reduce the cohesive strength of the intermediate layer so that it will peel by splitting within its thickness can be varied within wide limits. However, if insufficient filler is present, the force required to effect peeling can become excessive, and if very large amount of filler are used, the intermediate layer can become too weak. In general, it is preferred that the intermediate layer contains from 15 to 65 wt % of filler, and more particularly from 45 to 55 wt %. As will be appreciated, particulate fillers in the intermediate layer will usually impart at least some degree of opacity to the films, and it may be possible to reduce this opacity by the inclusion of an incompatible polymer in this layer. For example, the addition of polybutylene to polyethylene can enable lower amounts of inorganic filler to be used to achieve substantially the same peel strength. More particularly, substantially similar peel strengths can be achieved, but with reduced opacity, by using a blend of 55 wt % of low density polyethylene and 15 wt % of polybutylene containing 30 wt % of talc rather than a 50:50 (wt/wt) mixture of low density polyethylene and talc.

Changing the polymer of the intermediate layer will often necessitate the use of different incompatible polymers in the intermediate layer. For example, if propylene based copolymers with ethylene are used as the base polymer for the intermediate layer, other polymers can be used to reduce the amount of inorganic filler required to reduce the cohesive strength of the intermediate layer, e.g. ethylene based ionomers and low density polyethylene.

It should be noted that when certain polymers, for example polybutylene, are present in the intermediate layer, they may give rise to stringing of this layer when the heat seals are peeled, and it is therefore preferred that when they are used in this layer, they should be present in amounts which do not result in unacceptable degrees of stringing.

The thicknesses of the heat seal layer and the intermediate layer can in general be varied within wide limits. However, it is generally preferred that the heat seal layer be at least 5 µm thick when the films are to be heat sealed to fibrous materials such as paper and non-wovens in order for there to be sufficient of the heat seal layer material present to be penetrated into the fibrous material, whilst thicknesses of greater than 20 µm are not usually required. Heat seal layers which are approximately 10 µm thick have been found satisfactory for the purposes of the present invention.

The intermediate layer is preferably not more than 20 µm thick since the filler in this layer tends to impart haze and opacity to the films. Intermediate layers with a thickness of 5 µm and less are generally less preferred because they can be difficult to produce, and the preferred range of thickness is about 10 µm.

Films in accordance with the present invention also include at least one further polymeric layer, and indeed the two specified layers can in general be present as additional layers on any of a wide variety of polymeric films, thereby providing such films with the ability to form heat seals which peel particularly well. In some instances the two specified layers can merely be adhered directly to the surface of such a film so that the heat seal layer forms an external surface of the resulting multilayer film. In others, it may be necessary to include a tie layer to effect this bond.

Particularly preferred further polymeric layers for use in films of the present invention include layers of a polyamide, a polycarbonate, a polyester, polyvinyl chloride, a polyesterglycol copolymer, or polypropylene, these usually requiring an adhesive or tie layer to adhere them to the intermediate layer, and blown or cast coextruded films of high density polyethylene and low density polyethylene, and blown or cast coextruded films of ethylene vinyl acetate with ethylene acrylate copolymers or styrene-butadiene copolymers. These are examples of film structures which are widely used in the medical packaging art.

Films in accordance with the present invention can be produced by known methods. However, it is generally preferred to produce them by coextruding melts of the polymers and additives required for the various layers of the final films, followed by cooling to solidify the polymers in the form of a film. In general films of the present invention will not be oriented, but they can if desired be mono- or bi-axially oriented, for example using known methods. Another method is to laminate a film of the present invention, for example a four layer film consisting of an outer layer of high density polyethylene, an intermediate layer of low density polyethylene, a peelable layer, and an outer heat sealable layer, to another film, for example of a polyamide (nylon), a polycarbonate, a polyester, polyvinyl chloride, or a polyester-glycol copolymer, or to a foil.

Films in accordance with the present invention can also be produced by coextrusion coating of the heat seal layer and the intermediate layer on to a suitable support layer, for example a polyamide (nylon), a polycarbonate or a polyester, paper or a foil, using an adhesive layer to bond the two outer layers to the backing material.

Reference will now be made to the accompanying drawings which illustrate the formation of a heat seal between a film in accordance with the present invention and paper.

FIG. 1 shows a film in accordance with the present invention (A) before being heat sealed to a sheet of paper (B) using a heat sealing bar 6, the film (A) consisting of a heat seal layer 1, a peelable intermediate layer 2, and a base layer 3.

Figure 2:
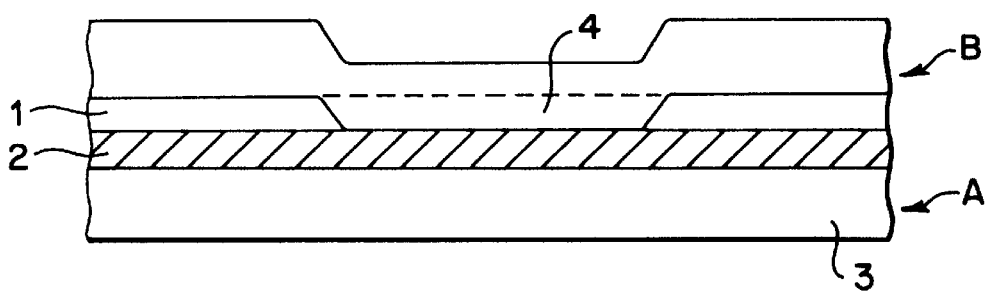

The film (A) is then heat sealed to the paper (B) to form a heat seal 4 as shown in FIG. 2. As can be seen, the heat seal layer 1 has penetrated into the paper as shown at 5, the paper (B) now being either in contact with the peelable intermediate layer 2 or close to being in contact with the peelable intermediate layer 2. Outside the heat seal zone 5 the paper (B) is in contact with the heat seal layer 2 but is not adhered to it.

Figure 3:
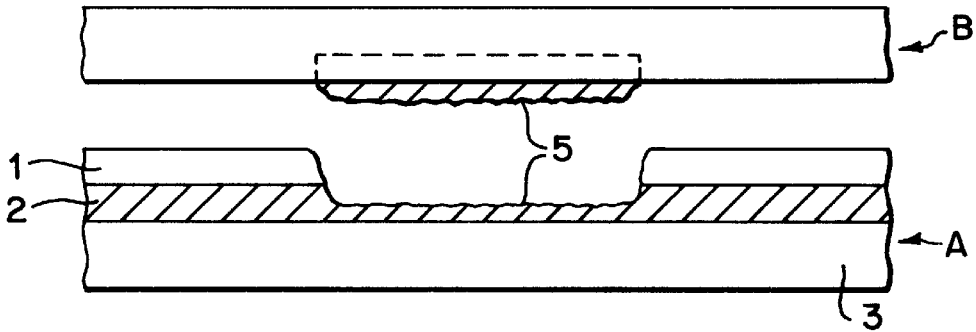

The heat seal is then peeled to produce a peeled seal as shown in FIG. 3, the brittle seal layer rupturing through to the peelable intermediate layer, and the peelable intermediate layer having split within its thickness leaving some of it on the paper (A) in the heat seal zone 5, whilst some of it remains on the film in this zone.

The brittle nature of the heat seal layer 1 causes it to fracture cleanly on both sides of the heat seal 5, thereby avoiding stringing.

The following Examples are given by way of illustration only.

EXAMPLE 1

A five layer polymer film 85 µm thick was cast by coextruding melts of the appropriate polymers through a slot die. The film produced had a 30 µm thick core layer of low density polyethylene with, on one surface, a 30 µm thick layer of nylon 6 adhered to the core layer by a 5 µm thick later of a tie layer consisting of a maleic anhydride grafted polyethylene, and on the other surface a 10 µm thick layer of a blend of equal weights of low density polyethylene and talc (90 wt % having a particle size of from 1–10 µm) and an outer layer of a 10 µm thick blend of low density polyethylene and a low molecular weight hydrogenated hydrocarbon resin. The film was cooled and then wound up.

Thereafter samples of this film were heat sealed to an uncoated paper using a sealing bar applied to the paper at different temperatures from 120° C. to 160° C. using a dwell time of 1 sec and a pressure of 500 kPa.

The resulting heat seals were allowed to cool and they were then peeled by pulling the paper from the film. In each case, peeling took place by fracture through the outer layer formed from the blend of the LDPE and the hydrocarbon resin and then by cohesive splitting within the intermediate layer in the area of the heat seal. Immediately after the heat seal region the peel broke out through the outer layer to give a clean peel without stringing.

The peel strengths of the seals formed at 120, 140 and 160° C. were 2.7, 2.7 and 2.8N/15 mm respectively, as measured using a constant 90° peel test, with 50 mm length samples conducted at 100 mm/min on a Lloyd mechanical tester showing that the peel strength is substantially independent of heat seal temperature.

Substantially identical films were produced, but with the intermediate layer of the low density polyethylene/talc blend being 5 μm thick rather than 10 μm thick.

Heat seals were produced as described above, at 120, 140 and 160° C., and the peel strengths of these seals were 2.5, 2.7 and 2.9N/15 mm, respectively. The seals peeled cleanly and without stringing.

EXAMPLE 2

A series of five layer films was prepared in a manner similar to that described in Example 1 except that the blend of low density polyethylene and talc was replaced by a variety of blends of low density polyethylene, polybutene-1 and talc. In each case the layers of this blend were 10 μm thick, and the outer layer of the blend of low density polyethylene and the low molecular weight hydrogenated hydrocarbon resin was 5 μm thick. The overall thicknesses of these cast films were therefore 80 μm.

Samples of these films were then heat sealed to uncoated paper as described in Example 1, and each film type was heat sealed to the paper at either 120 or 150° C. The peel strengths which were obtained are shown in Table 1, and the seals peeled cleanly without stringing.

TABLE 1

| Wt % LDPE/PB/Talc | Seal Temp (° C.) | Peel Strength (N/15 mm) |
| --- | --- | --- |
| 50/30/20 | 120 | 1.7 |
| 50/30/20 | 150 | 2.2 |
| 60/20/20 | 120 | 3.4 |
| 60/20/20 | 150 | 3.6 |
| 55/15/30 | 120 | 3.8 |
| 55/15/30 | 150 | 4.0 |
| 50/20/30 | 120 | 2.8 |
| 50/20/30 | 150 | 3.1 |

EXAMPLE 3

A five layer polymer film 100 μm thick was coextruded through a slot die from melts of the appropriate polymers. The film had a first layer 25 μm thick consisting of an ethylene/vinyl acetate copolymer, a second layer 30 μm thick consisting of an ethylene acrylate ionomer (Surlyn), a third layer 25 μm thick consisting of the ethylene/vinyl acetate copolymer used for the first layer, a fourth layer 10 μm thick consisting of a blend of equal weights of low density polyethylene and talc, and a fifth layer 10 μm thick consisting of 80 wt % of low density polyethylene and 20 wt % of a low molecular weight hydrogenated hydrocarbon resin. The film was cooled and then wound up.

Samples of the film were then heat sealed to uncoated paper as described in Example 1, and the peel strengths of the heat seals formed at different temperatures were then determined as described in Example 1. The peel strengths of the seals formed at 130, 140, 150 and 160° C. were 3.2, 3.1, 3.2 and 3.1N/15 mm respectively, demonstrating that peel strength was independent of sealing temperature. The seals peeled cleanly through the heat seal layer and without stringing.

Another film of the same composition was prepared, except that the first, second and third layers were 45, 40 and 45 μm thick respectively, the overall thickness of the film being 150 μm. The respective peel strengths of heat seals formed between this film and paper under substantially the same conditions at 120, 130, 140, 150 and 160° C. were substantially the same as had been obtained for the 100 μm thick film. Again, the seals peeled cleanly through the heat seal layer and without stringing.

EXAMPLE 4

A four layer polymeric film 100 μm thick was produced by coextruding melts of the appropriate polymers through a slot die. The film had a first layer 50 μm thick consisting of high density polyethylene, a second layer 30 μm thick consisting of low density polyethylene, a third layer 10 μm thick consisting of a blend of equal weights of low density polyethylene and talc, and a fourth layer consisting of a blend of 80 wt % of low density polyethylene and 20 wt % of a low molecular weight hydrogenated hydrocarbon resin. The resulting film was cooled and then wound up.

Samples of the film were then heat sealed to uncoated paper as described in Example 1, and the peel strengths of the seals formed at different temperatures were then determined as described in Example 1. The peel strengths of the seals formed at 130, 140, 150 and 160° C. were 3.3, 3.3, 3.0 and 3.0N/15 mm respectively, demonstrating that peel strength was substantially independent of sealing temperature. The seals peeled cleanly through the heat seal layer and without stringing.

Another film of the same composition was prepared, except that the first and second layers were 70 and 60 μm thick respectively, the overall thickness of the film being 150 μm. The respective peel strengths of heat seals formed between this film and paper under substantially the same conditions as described in Example 1 at 120, 130, 140, 150 and 160° C. were substantially the same as had been obtained for the 100 μm thick film. Again, the seals peeled cleanly through the heat seal layer and without stringing.

EXAMPLE 5

A four layer polymer film 40 μm thick was produced by coextruding melts of the appropriate polymers through a slot die. The film had a first layer 10 μm thick consisting of high density polyethylene, a second layer 10 μm thick consisting of low density polyethylene, a third layer 10 μm thick consisting of equal weights of low density polyethylene and talc, and a fourth layer 10 μm thick consisting of a blend of 80 wt % of low density polyethylene and 20 wt % of a low molecular weight hydrogenated hydrocarbon resin. The film was cooled and then wound up.

This coextruded film was subsequently adhesive laminated to a 12 μm thick polyester film using a heat curing liquid adhesive to a thickness of 2 μm, and the resulting six layer film was cooled and then wound up.

Samples of the film were then heat sealed to uncoated paper as described in Example 1, and the peel strengths of the heat seals formed at different temperatures were then determined as described in Example 1. The peel strengths formed at 120, 130, 140, 150, 160, and 170° C. were 2.9, 3.0, 2.9, 2.9, 3.0 and 2.9N/15 mm respectively. The seals peeled cleanly through the heat seal layer and without stringing.

We claim:

1. A heat sealable polymeric film comprising an outer, polymeric heat seal layer having a viscosity at its heat sealing temperatures such that it will flow into interstitial spaces between the fibers of a fibrous material and encapsulate the fibers at such temperatures, an intermediate polymeric layer in contact with the heat seal layer, the intermediate polymeric layer being capable of cohesively splitting when the heat sealed film is peeled, and at least one further polymeric layer, the heat seal layer being easier to fracture than the intermediate layer at the temperature at which peeling is to be effected so that heat seal layer ruptures rather than peeling continuing through the intermediate layer once peeling has been effected through the heat sealed zone.

2. A heat sealable polymeric film according to claim 1, wherein the outer polymeric heat seal layer comprises a blend of a polyolefin and an additive which embrittles the heat seal layer at the temperature of peeling, the blend having a sufficiently low viscosity over its heat sealing temperature range to penetrate the interstitial spaces between the fibers of a non-woven material, the intermediate polymeric layer comprises a blend of a polyolefin and a filler which facilitates cohesive splitting within the layer when the heat sealed film is peeled, and at least one further polymeric layer.

3. A film according to claim 1, wherein the heat seal layer comprises a blend of a polyolefin and an additive which embrittles the heat seal layer at the temperature of peeling.

4. A film according to claim 3, wherein the polyolefin comprises polyethylene or a propylene/ethylene copolymer.

5. A film according to claim 1, wherein the additive which embrittles the heat seal layer comprises a poly-di-pentene or a polyterpene, α-methyl styrene resins, vinyltoluene/α-methyl styrene resins, modified aromatic resins.

6. A film according to claim 1, wherein the heat seal layer contains from 5 to 30 wt % of an additive which embrittles the layer.

7. A film according to claim 1, wherein the intermediate layer comprises a blend of a polyolefin and a filler or foaming agent.

8. A film according to claim 7, wherein the intermediate layer comprises a blend of from 85 to 35 wt % of a polyolefin and from 15 to 65 wt % of a filler, or a blend of from 99 to 95 wt % of a polyolefin and from 1 to 5 wt % of a foaming agent.

9. A film according to claim 7, wherein the polyolefin comprises polyethylene or a propylene/ethylene copolymer.

10. A film according to claims 7, wherein the blend includes an incompatible polymer.

11. A film according to claim 1, wherein the intermediate layer is at least 5 μm thick.

12. A film according to claim 1, wherein the at least one further layer comprises a layer of a polyamide, or a layer of a polyester, a polycarbonate, polyvinyl chloride, polypropylene, high density polyethylene, a polyester-glycol copolymer, ethylene vinyl acetate, an ethylene acrylate terpolymer, or a styrene-butadiene copolymer.

13. A film according to claims 12, wherein the at least one further layer comprises two layers of ethylene/vinyl acetate copolymers with a layer of a polyethylene ionomer resin therebetween.

14. A film according to claim 1, wherein the intermediate layer includes a pigment.

15. A film according to claim 1, wherein the heat seal layer contains a pigment.

16. A film according to claim 1, wherein the heat seal layer and the at least one further layer include different colored pigments.

17. A film according to claim 1, wherein the intermediate layer and the at least one further layer include different colored pigments.

18. A heat sealed laminate formed between the heat seal layer of a film according to claim 1 and a non-woven cellulosic or other non-woven polymeric material.

19. A laminate according to claim 18, wherein the non-woven material comprises an uncoated paper or a non-woven fabric.

* * * * *